(12) United States Patent
Bielamowicz et al.

(10) Patent No.: US 9,898,726 B2
(45) Date of Patent: Feb. 20, 2018

(54) SECURITY SYSTEM

(71) Applicant: Talaris Limited, Basingstoke (GB)

(72) Inventors: Michael Eugene Bielamowicz, Napperville, IL (US); Symon Patrick Ashby Buckman, Dundee (GB); Bryan James Christophersen, Fareham (GB)

(73) Assignee: Glory Global Solutions (International) Limited, Basingstoke, Hampshire (GB)

( * ) Notice: Subject to any disclaimer, the term of this patent is extended or adjusted under 35 U.S.C. 154(b) by 309 days.

(21) Appl. No.: 13/852,004

(22) Filed: Mar. 28, 2013

(65) Prior Publication Data

US 2014/0297433 A1 Oct. 2, 2014

(51) Int. Cl.
*G06Q 20/20* (2012.01)
*G06Q 20/32* (2012.01)
(Continued)

(52) U.S. Cl.
CPC ......... *G06Q 20/206* (2013.01); *G06F 21/316* (2013.01); *G06F 21/32* (2013.01); *G06F 21/34* (2013.01); *G06F 21/35* (2013.01); *G06F 21/629* (2013.01); *G06Q 20/20* (2013.01); *G06Q 20/202* (2013.01); *G06Q 20/204* (2013.01); *G06Q 20/32* (2013.01); *G06Q 20/401* (2013.01);
(Continued)

(58) Field of Classification Search
CPC .... G06C 20/20; G06C 20/206; G06C 20/202; G06C 20/204; G06C 20/32
USPC ......................................................... 705/18
See application file for complete search history.

(56) References Cited

U.S. PATENT DOCUMENTS 8,117,127 B1 2/2012 Sanders et al.
2005/0268107 A1 12/2005 Harris et al.
(Continued)

FOREIGN PATENT DOCUMENTS

EP 1 918 845 A2 5/2008

OTHER PUBLICATIONS

Holzinger, Marcus J. Optimal Control Applications in Space Situational Awareness. University of Colorado at Boulder, ProQuest Dissertations Publishing, 2011.*
(Continued)

*Primary Examiner* — Ryan Zeender
*Assistant Examiner* — Fawaad Haider
(74) *Attorney, Agent, or Firm* — Renner, Kenner, Greive, Bobak, Taylor & Weber

(57) ABSTRACT

A terminal for use in a retail banking system comprises an interface for receiving multiple types of personal authentication elements. An authentication request for a user is associated with one or more of these types of element. The terminal also comprises a security module for providing access to a plurality of different access spaces of the system, each space comprises a different respective function or combination of functions of the system. For each access space, the security module provides a mapping between that access space and a respective one or more of the types of personal authentication element. Based on this mapping, the security module is thus configured to grant the user with access to one of the access spaces on condition of being mapped to the one or more types of personal authentication element associated with the authentication request for the user, and on condition those elements are verified.

7 Claims, 3 Drawing Sheets

(51) Int. Cl.
| | |
|---|---|
| *G06F 21/31* | (2013.01) |
| *G06F 21/32* | (2013.01) |
| *G06F 21/35* | (2013.01) |
| *G07F 19/00* | (2006.01) |
| *G06Q 20/40* | (2012.01) |
| *G07G 1/14* | (2006.01) |
| *G07D 11/00* | (2006.01) |
| *G06F 21/34* | (2013.01) |
| *G06F 21/62* | (2013.01) |
| *G06Q 40/02* | (2012.01) |
| *G07C 9/00* | (2006.01) |

(52) U.S. Cl.
CPC ......... *G06Q 20/4014* (2013.01); *G06Q 40/02* (2013.01); *G07D 11/0051* (2013.01); *G07F 19/20* (2013.01); *G07G 1/14* (2013.01); *G07C 9/00126* (2013.01)

(56) References Cited

U.S. PATENT DOCUMENTS

| | | |
|---|---|---|
| 2008/0215878 A1* | 9/2008 | Gemmo ................. 713/155 |
| 2009/0007249 A1 | 1/2009 | Lu et al. |
| 2011/0106681 A1* | 5/2011 | Cockerell ............. G06Q 10/06 705/35 |
| 2011/0162046 A1 | 6/2011 | Forster et al. |
| 2011/0320345 A1 | 12/2011 | Taveau et al. |
| 2012/0084734 A1 | 4/2012 | Wilairat |
| 2013/0067546 A1 | 3/2013 | Thavasi et al. |

OTHER PUBLICATIONS

International Search Report (PCT/EP20141056358) (10 pages—dated Jun. 5, 2014).
GB Search Report (Application No. GB1309682.1) (3 pages—dated Dec. 11, 2013).
Chinese Office Action (Application No. 201480018636.7 (18 pages dated Apr. 5, 2017).

* cited by examiner

SECURITY SYSTEM

FIELD OF THE INVENTION

The present invention relates to security in a banking system, e.g. a retail system comprising one or more machines for handling cash or financial documents in a mechanical manner.

BACKGROUND

In a conventional branch of a bank, each teller has a workstation connected to a machine for dispensing, accepting or recycling physical tokens of monetary value ("cash"), typically in the form of bank notes and/or coins. Such a machine may be referred to as a teller cash dispenser (TCD), teller cash acceptor (TCA) or teller cash recycler (TCR), the latter being able to both dispense and accept cash and to re-dispense accepted cash to other customers. Each machine is a peripheral connected to only one or perhaps two teller workstations, each connection being a dedicated, one-to-one physical connection in the form of a cable such as a serial cable.

Each teller's work station may also be separately connected to a core bank system via a network of the branch. The core system is where the data of the customers' bank accounts are held. To process a transaction such as dispensing cash, the teller may use a dual keyed model whereby he or she first uses the workstation to key in the transaction from the workstation to the core system, and if the core system approves the transaction it returns an approval to the teller's work station. The teller then uses the workstation to separately key in the same transaction from the workstation into the peripheral cash-handling machine in order for the workstation to control the machine to complete the transaction. This way the cash-handling machine is kept isolated from the wider network. Alternatives to the dual keyed model include screen scraping, graphical integration or full integration.

TCDs, TCAs, TCRs or other kinds of machine may also be able to handle other physical (typically paper) financial documents such as cheques, bills, invoices, debit forms, account transfer forms and/or bank passbooks. Other examples include deposit slips, payments documents, savings withdrawal tickets, cheque deposit slips, savings deposit slips, and/or other documents used as proof of deposit at a financial institution. Workstations associated with such machines may also provide other functionality like access to account balances or other records.

Traditionally in the highly security-conscious banking environment, a given member of bank staff has a single, fixed set of permissions. For instance a teller may only be allowed access to basic functionality like accepting and dispensing cash, while a supervisor may have access to a higher level which includes the basic functionality plus additional functionality like access to sensitive records. To obtain a different level of access to the system, log in is performed with a different user ID and password.

SUMMARY

According to one aspect of the present invention, there is provided a terminal for use in a banking system. The terminal comprises an interface for receiving multiple types of personal authentication elements, and an authentication request for a user is associated with one or more of these types of personal authentication element. The terminal also comprises a security module operable to provide access to a plurality of different access spaces of the system. Each access space comprises a different respective function or combination of functions of the system. The security module is configured, for each of the access spaces, to provide a mapping between that access space and a respective one or more of the types of personal authentication element. Based on this mapping, the security module is thus configured to grant the user with access to one of the access spaces on condition of being mapped to the one or more types of personal authentication element associated with the authentication request for the user, and on condition of verifying those one or more types of personal authentication elements for the user.

For example, the different types of authentication may comprises a password as one type, and biometric information such as a fingerprint or facial recognition as one or more further types. Other examples may comprise behavioural information such as handwriting or signature recognition, or geographic information such as a current GPS fix from the user's phone or tablet.

As the security module maps different access spaces to different types of such authentication information and/or different combinations of types (e.g. provided at login), it may be said that one door provides access to different rooms or compartments when the right set of keys is used. This may be used to allow a more flexible approach to providing different functionality to users in different roles and/or on different occasions, and/or to allow a more seamless way for users to access different kinds of functionality, while maintaining a suitable degree of security appropriate to each access space.

For instance, in embodiments the system need not be confined to strictly hierarchical or nested layers whereby a higher layer contains all the functionality of a lower layer. Instead, there need not necessarily be the concept of one space being superior to another in a hierarchy, i.e. so a first access space need not necessarily contain all the functionality of a second space while the second space need not necessarily contain all the functionality of the first space. An example would be separate spaces for a teller and a technician: the teller may be given access to transactions but need not have access to diagnostic or other maintenance functions, while the technician may be provided with these functions but not the ability to conduct actual transactions. Another example would be separate spaces for a teller and a manager in a headquarters: the teller may be given access to cash dispensing functions but access to only limited records, while the manager may have access to more records but need not necessarily be given the ability to dispense cash. Further, because the type of authentication can be made different for these roles, an appropriate degree of security can be maintained for that role and/or the way of challenging the security can be made appropriate to the role.

Alternatively or additionally, in embodiments the user may be taken straight to the relevant access space without have to go through a succession of different layers of authentication, and/or without having to have different accounts with different user IDs. For instance, if the user logs in with only limited authentication information, say just a password, he or she may be granted a basic access space within the system. But if the user adds an extra item of authentication information such as a fingerprint or facial recognition up front at the initial access point, he or she may be granted access straight to a second, more secure access space without having to login with a different user ID or be prompted with a second login stage. For example a user may be given just basic teller functionality like dispensing limited amounts of cash if he or she logs in with only a basic type of authentication like a password, while the same user may be taken straight to a more secure access space allowing higher value transactions or more advanced kinds of transaction if he or she performs the same login with the same username and password but at the same time adds an additional element like a fingerprint or facial recognition.

According to further aspects of the present invention, there are provided corresponding systems, methods of providing access to multiple levels of a banking system, and corresponding computer program products comprising code embodied on a computer-readable storage medium.

BRIEF DESCRIPTION OF THE DRAWINGS

For a better understanding of embodiments of the present invention and to show how they may be put into effect, reference is made to the accompanying drawings in which.

DETAILED DESCRIPTION OF PREFERRED EMBODIMENTS

Figure 1:
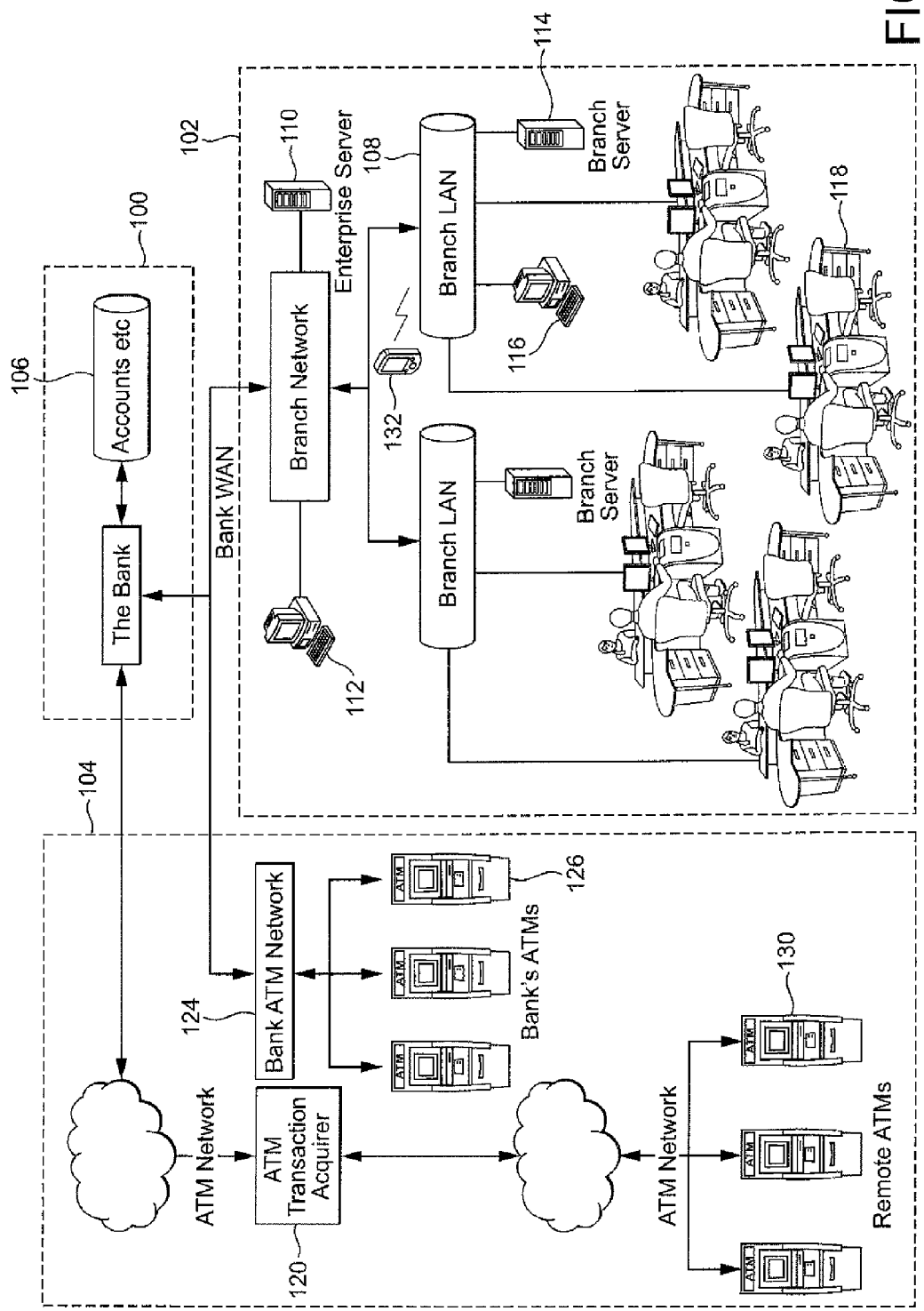
FIG. 1 is a schematic diagram of a banking system.

FIG. 1 provides a schematised illustration of a retail banking environment. This comprises a core system 100 of the bank, a branch banking network 102, and an ATM network 104.

The core system 100 comprises a database 106 which is where the records for all the customers of the bank are stored, including the account data for each customer defining the monetary value of the account and potentially other factors such as a credit or overdraft limit. Any transaction such as those involving dispensing cash to a customer, accepting deposit of cash from a customer, transferring funds between accounts or loaning funds to a customer's account must be cleared by the core system 100 and recorded in the database 106 of the core system 100.

The branch banking network 102 is connected to the core system 100 by a wide area network (WAN) of the bank. The branch banking network 102 is the part of the banking environment relating to the interface between branch staff and customers. Within the branch banking network 102 for the whole bank enterprise, each individual branch comprises a respective local area network (LAN) 108. Each branch's LAN 108 comprises a branch server 114 and teller equipment 118 for one or more tellers.

Figure 3:
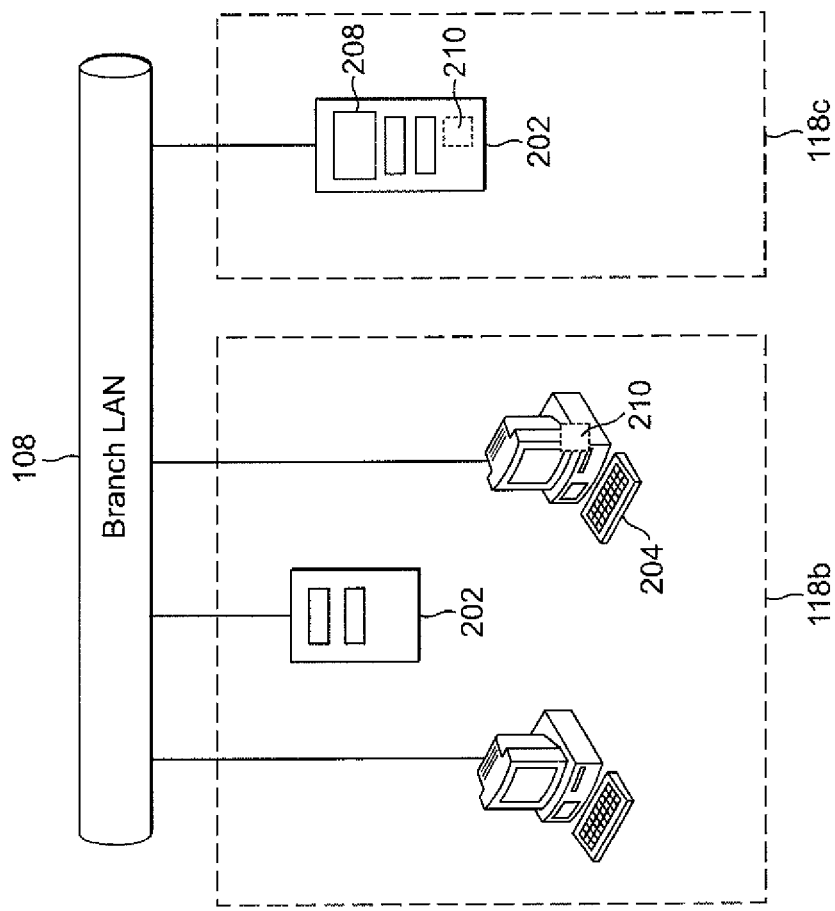
FIG. 3 is a schematic diagram of further teller equipment.
Figure 2:
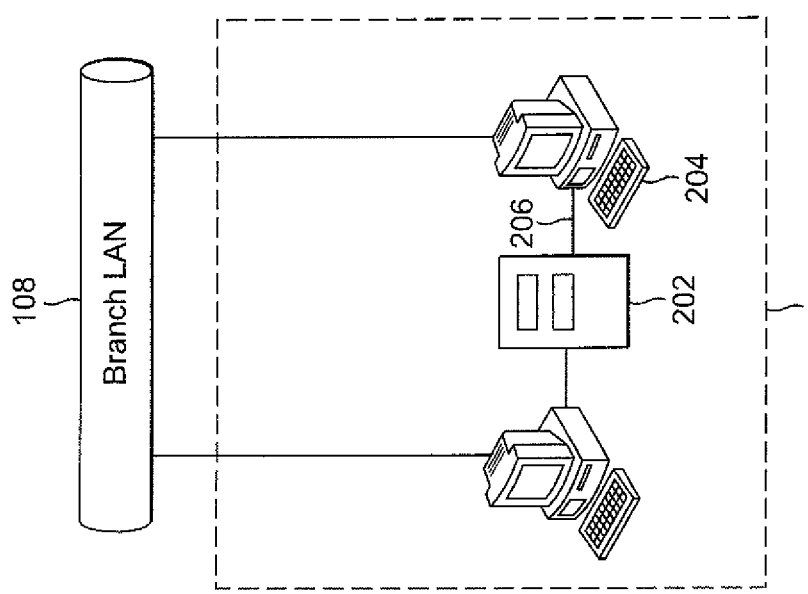
FIG. 2 is a schematic diagram of teller equipment.

FIGS. 2 and 3 give schematic block diagrams showing examples of teller equipment 118. The teller equipment 118 comprises one or more cash-handling machines 202, e.g. in the form of a teller cash dispenser (TCD), teller cash acceptor (TCA) and/or teller cash recycler (TCR). Each cash-handling machine 202 comprises a secure cash box and a mechanism for dispensing and/or accepting cash.

Cash handling refers to the accepting, dispensing, recycling or other processing of tangible, physical tokens of monetary value, typically tokens issued by governments such as coins and bank notes. However, it is also possible to provide cash-handling machines equipped with additional capability of accepting, dispensing, recycling or processing other physical documents such as: cheques, bills, invoices, debit forms, account transfer forms and/or bank passbooks; and/or deposit slips, payments documents, savings withdrawal tickets, cheque deposit slips, savings deposit slips, and/or other documents used as proof of deposit at a financial institution. For instance, a cash-handling machine may comprise a mechanism, sensor and image recognition software for processing cheques or settling bills or invoices in an at least partially automated manner. Further, it is also possible to provide dedicated document handling machines for accepting, dispensing, recycling or processing such physical documents but not necessarily coins or notes. Physical or tangible here excludes pure electronic documents, so excluding documents existing purely in the form of data on a computer (though they may be represented in electronic form at some stage in the processing). Typically these physical documents are paper documents, but could also include plastic documents for example. The following will be discussed in terms of cash-handling machines, but it will be understood that a cash-handling machine may have other document handling functionality, and/or that the teachings may be applied to other kinds of machines for handling financial documents.

It will be appreciated these kinds of cash or document handling machines are suitable for use in a retail banking environment, in which a financial institution provides an interaction between staff and consumers. Typically this interaction is provided via a "high street" style presence or the like, and may be provided either from one of the institution's own branches or the commercial outlet of a partner or representative. Note that while it may be said the institution as a whole provides an interaction with the consumer, it may nonetheless comprise staff or other aspects that do not directly interact with the consumer, e.g. a supervisor or technician does not necessary interact with customers, or a customer may use a drop-box may be used by a customer to deposit cash or cheques, etc.

FIG. 2 shows a more traditional arrangement 118a for the teller equipment 118, where the cash-handling machine 202 comprises a conventional TCD, TCA or TCR without its own user interface. In this case the user interface is provided by a separate terminal in the form of a teller workstation 204. In the traditional set-up each cash-handling machine 202 is connected to only one or at most two teller workstations 204, and is strictly a peripheral of its one or two respective work stations 204, each connection being a direct, dedicated, one-to-one physical connection 206 in the form of a cable such as a serial cable. The cash-handling machine is not connected to any other part of the network 102, 100 by any other connection and is strictly isolated from the wider network 102, 100.

FIG. 3 shows an alternative arrangement 118b and/or 118c for the teller equipment 118, which shifts away from the workstation centric model of FIG. 2 towards a more branch-wide or even enterprise-wide model. In this case each cash-handling machine 202 comprises a network port connecting directly onto the branch LAN 108 without needing to be connected immediately to a teller workstation 204 (even though the workstation 204 may still be physically adjacent). The cash-handling machine 202 is now a network addressable device rather than a peripheral of a workstation 204, the machine 202 having its own network address and being configured to communicate according to a suitable network protocol such as TCP-IP.

In one example 118b of such an arrangement, the cash-handling machine 202 still does not have its own user interface and the workstation 204 is arranged to communicate with the cash-handling machine 202 via the branch LAN 108 in order to conduct transactions such as dispensing and/or accepting cash. In embodiments, some or all of the software for operating the cash-handling machine 202 may be hosted on the branch server 114, or even an enterprise server 110 of the wider branch-banking network 102. This software may be accessed using a complementary application on the workstation 204.

The branch LAN 108 may also comprise one or more further branch terminals 116 other than a teller workstation 204, not immediately located next to a cash-handling machine 202. For instance this may be a supervisor's terminal, a terminal of a manager's office or a terminal in a separate client meeting room. In the network model, a further branch terminal 116 like this may also be enabled to access functionality of the cash-handling machines 202. Similarly, connected to the wider branch banking network 102 but not necessarily associated with any single branch, the branch banking network 102 may further comprise one or more terminals 112 such as a terminal of a regional manager's office or a headquarters. Again such terminals 112 may be enabled to access functionality of the cash-handling machines 202 in one or more of the various branches via the branch banking network 102.

For example, the network model may provide wider visibility of inventory (how much cash is in which cash-handling machines 202). A teller, supervisor or manager having branch-wide or regional responsibility may be able to view inventory of a plurality of different cash-handling machines 202 in one or more branches via the network 114 or 102 using one of the further terminals 116 or 112 or work stations 204. This enables a more intelligent management of inventory, as the user can see a wider picture of which machines 202 are low on cash and which are relatively full, and plan the movement of cash between them in a more efficient given visibility of this information over the network. That is, it may be used to reduce cash-in-transit steps (deliveries, recoveries and/or collections).

A further possible use is to provide diagnostic or maintenance related information, e.g. a technician may access the status of cash-handling machine remotely from a regional terminal 112. This may enable the technician to arrive at the branch more prepared for the required maintenance (e.g. taking the right tools), provide remote software updates, and/or even perform a remote recovery for some faults.

In another example arrangement 118c, the cash-handling machine 202 has its own user interface 208 integrated into the same terminal (in the same housing) allowing it to be operated directly. An example of this is a teller assisted machine, which is partially (but not fully) self-service. The customer can initiate or perform part of a transaction him or herself, but a teller is still available on the branch floor to assist in the transaction. In this case one of the users may be a customer as opposed to a member of bank staff as in the other examples above.

Again some or all of the software may be hosted on a server 110 or 114, but this time accessed via a complementary application running on the teller assisted machine 118c itself rather than a separate workstation 204. Also, the inventory and/or diagnostic or maintenance information for this machine 118c may again be made visible to other terminals 112, 116 or 204.

In another example, a mobile user terminal 132 such as a smart phone, tablet or laptop may be able to access some functionality of the system via a suitable wireless connection with the LAN 108 or wider network 102, e.g. to access inventory or diagnostic information.

The ATM network 104 is a separate, distinct system to the branch banking network 102. The ATM network 104 comprises a plurality of ATMs (automatic teller machines) 128 of the bank, and a plurality of ATMs 130 of one or more other banks.

Even in the case where the teller equipment 118 takes the form of a teller assisted machine 118c, this is not an ATM. Firstly, the teller equipment 118 is equipment that involves an interaction between a member of bank staff (a human teller) and the customer, and is never entirely self-service. Secondly, any transaction performed through the branch banking network relates to an account with that particular bank, i.e. that particular enterprise. In contrast, a user does not need to have an account with a given bank to use the ATM of that bank. To this end the ATM network 104 comprises an ATM transaction acquirer 120 to couple between the core system 100 of the bank and the core system(s) of the one or more other banks, and is arranged to perform the relevant interaction to dispense cash from the ATM of one enterprise and deduct from the account of another enterprise. On the other hand, an ATM cannot reach other accounts than that of the customer operating it (typically only the account associated with the card with which the ATM is presented), whereas a teller assisted machine would allow some operators like a teller or supervisor to access many different accounts of other users (multiple customers' accounts). Further, the branch banking network 102 and ATM network 104 operate on different protocols.

A security system in accordance with embodiments of the present invention will now be discussed in relation to FIGS. 3 and 5, and by contrast with reference to FIG. 4

As mentioned, the invention provides access to a plurality of different access spaces, each comprising a different respective function or combination of functionalities. For instance, the functionality of one or more levels may comprise one or more of the following.

The functionality may comprise being enabled to perform a transaction, such as to dispense cash from a cash-handling machine 202, deposit cash in a cash-handling machine 202, or move money electronically between accounts. If a user is a customer the functionality may comprise being enabled to dispense cash from his or her own account, deposit cash into his or her own account, or transfer money from his or her own account to another account. If the user is a member of bank staff such as a teller, the functionality may comprise being enabled to dispense cash from a customer's account, deposit cash into a customer's account, or transfer money between customers' accounts. For example the account may be a current account or a savings account. The functionality may also comprise pre-ordering of cash to be dispensed later.

The functionality may comprise being enabled to perform (at least in part) other kinds of document handling transaction, such as processing a cheque, or settling a bill or invoice. The functionality may comprise the ability to perform other operations relating to documents like cheques, bills and invoices. For example the functionality may comprise the ability to manually intervene at one or more stages of processing a cheque, for instance to resolve an error or generally check the results of the document handling machine's image recognition, e.g. to check whether the automatically recognised signature, recipient or amount is correct.

The functionality may relate to other kinds of transactions or proposed transactions such as loans or mortgages, e.g. to request approval for a loan or mortgage. The functionality may comprise a customer credit check. Another example would be functionality relating to investments such as stocks or shares, e.g. to buy or sell shares. Yet another example would be functionality relating to valuable items such as precious metals, jewels or jewelry held with the bank.

The functionality may comprise access to information about the user, such as address, phone number or photographic record. The functionality may comprise access to the user's bank records, e.g. to view a statement of a current account, savings account, loan, mortgage, investment account or valuable items deposited with the bank. Where the user is a customer, the functionality may only comprise access to the user's own information or bank records. Where the user is a member of bank staff the functionality may comprise access to one or more customers' information or bank records.

Where the functionality comprises the ability to perform any kind of transaction such as those discussed above, a threshold may be placed on the amount of the transaction, and different functionality spaces may comprise the ability to deal with different values of transaction, or different variants of the transaction. For instance one access space may allow access to a functionality, or combination of functionalities, that only enables a transaction up to a threshold amount, while another access space may allow access to a functionality, or a combination of functionalities, that enables a transaction above the threshold. E.g. the threshold may relate to an amount of cash that can be withdrawn, deposited or transferred between accounts; an amount of load or mortgage that can be approved; an amount of stocks or shares that can be dealt with; or a value of items that hand be handled.

The above are examples of functionality relating to front-office operations, i.e. those involving moving of funds externally in or out of the bank or involving a customer. Alternatively or additionally, the functionality may comprise back-office operations relating to internal operations within the bank.

For example the functionality may comprise access to inventory information, such as information on how much cash is currently held in a cash-handling machine 202. The functionality may comprise inventory management, such as the ability to move cash internally within the banking system (cash-in-transit operations), e.g. by moving cash from the secure cash boxes of one or more cash-handling machines 202 to those of one or more other cash-handling machines 202. A threshold may be placed on the amount that can be moved, and different functionality spaces may comprise the ability to move different amounts of cash.

Further, the functionality may comprise access to diagnostic or maintenance information, such as information on faults of cash-handling machine 202 or the ability to remotely diagnose such faults; the ability to perform remove recovery operations; or the ability to update software of a terminal or the system, e.g. of a cash-handling machine 202, workstation 204 or server 110 or 114. The functionality may comprise the ability to change a mode of operation of a terminal of the system, e.g. of a cash-handling machine 202, workstation 204 or server 110 or 114.

Some aspects of functionality may be relevant to both front-office and back-office operations, e.g. detecting counterfeit cash.

One or more terminals of the system are provided with a security module 210. The security module 210 is preferably implemented as a portion of code stored on a storage medium of the terminal and arranged for execution on a processor of that terminal. In embodiments a security module 210 is implemented on one or more of the teller workstations 204, one or more of the further terminals 112 or 116, and/or one or more of the teller assisted machines 118c. The security module 210 is configured to grant access to different access spaces of the system comprising different combinations of functionality.

For example the different access spaces may comprise an access space appropriate to a customer, an access space appropriate to a basic teller, an access space appropriate to a branch supervisor, an access space appropriate to a branch manager, an access space appropriate to a regional manager, an access space appropriate to a headquarters, and/or an access space appropriate to a technician performing diagnosis or maintenance. Note that an access space here is not a geographic or geometric area or region, but a compartmentalisation of different operations potentially available to users within the system. Each space may provide a combination of any of the above example aspects of potential functionality. For example, a customer may only have access to his or her own account(s), while a teller may have access to customers' accounts but only for performing transactions of certain kinds or within a certain threshold value, and a supervisor may have access to higher value transactions and/or more advanced kinds of transactions. On the other hand another user like a technician might have access to some other kinds of functionality the customers, tellers and supervisors do not, like diagnostic or other maintenance functionality, but may not have access to other functions like the ability to perform actual customer transactions. Alternatively or additionally there could be different levels or kinds of functionality for a given kind of user, e.g. a first teller level or first customer level may provide access only to information, while a second teller level or customer level may provide access to transactions.

Further, each terminal 204, 118c, 112 or 116 comprises an interface having one or more types of transducer such as a keyboard, touch screen, touch pad, touch pad with stylus, mouse, fingerprint, pad web-cam with image recognition, microphone with voice recognition, wireless transceiver and/or card reader. The interface is thus able to receive different types of input, which can comprise different types of personal authentication elements.

For example, the different possible types of personal authentication elements may comprise the user's postal address, a password of the user, a name of the user (e.g. given name or alias), information from a bank card, and/or PIN number. The different types of personal authentication elements may comprise biometric information such as a fingerprint, an iris scan, and/or facial recognition.

The different types of personal authentication elements may comprise location information such as a current geographic location of the user (e.g. a GPS fix of his or her mobile terminal), or a proximity of an RF tag of the user (e.g. in an RF card) to the terminal, and/or a detection of local network that a mobile user terminal of the user is currently connected to. In the latter example, this may be to detect whether the user is currently present on the private local network 108 of the bank where he or she is trying to make a transaction, and therefore in the proximity; or conversely to detect he or she is on a different network that is not proximate. The mobile terminal in question could be the mobile terminal 132 the user is currently using to access (or try to access) the access space in question, or another register device the user happens to have about his or her person.

In further examples, the different types of personal authentication elements may comprise detection of the user's mannerisms or behaviour, such as voice recognition (e.g. to recognise a characteristic quality in the user's voice), handwriting recognition, recognition of a written signature, detection of a characteristic pressure pattern when the user writes or draws with a stylus, detection of a characteristic typing speed or pattern when the user types on a keyboard, and/or detection of a characteristic mouse, touchpad, stylus or tracker ball movement or pressure pattern.

The security module 210 is configured to provide a mapping between access spaces and corresponding combinations of personal authentication elements, each combination unlocking a different respective one of the spaces. It thus grants access to a given access space in dependence on which of a plurality of different types of personal authentication element are presented to the system, and the access may depend on the number of elements presented (as well as verification of those elements). Thus different compartments are unlocked through the same door depending on what set of keys is used, Embodiments of the present invention seek to avoid a situation as illustrated for example in FIG. 4 where a user has to go through several successive, nested layers or stages of authentication, and/or where the layers are strictly hierarchical in nature.

Figure 4:
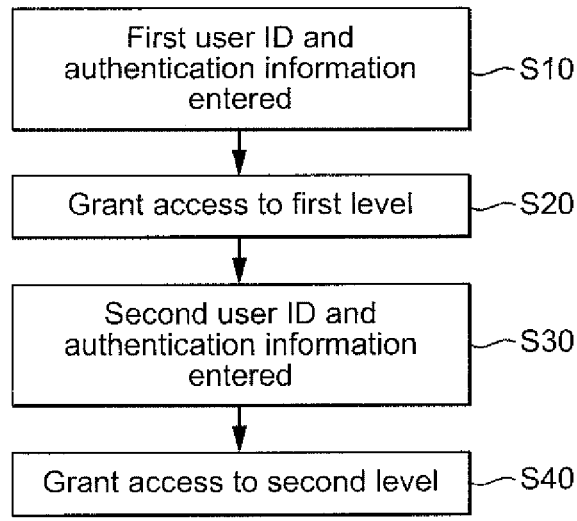
FIG. 4 is a schematic flow chart of a login method.

In FIG. 4, the user has to login with a first user ID (e.g. username) and authentication information (password) at step S10. At step S20, the user is then granted access to a first level of functionality of the system (assuming the first authentication information is successfully verified). To gain a different level of access, the user has to login with a different user ID (e.g. different username) and associated password on a different occasion as shown at step S30. The user is then granted access to the second level as shown at step S40. Further, the first level may be entirely subsidiary to the second level, in that the second level contains all the functions of the first level.

Even if this was brought under one user ID, it would be preferable to avoid the user having to go through multiple "doors" or entry points to get to the second or further levels. That is, to avoid a situation where the user has to perform a first login stage based only on first authentication information, then be granted access to the first level, and only then have available the second login stage which the user has to go through separately based on second authentication information in order to reach the second level. Alternatively or additionally, it would be desirable to avoid a situation that is strictly constrained to the concept of hierarchical layers, with a lower level being entirely nested within a second, higher or superior layer.

Figure 5:
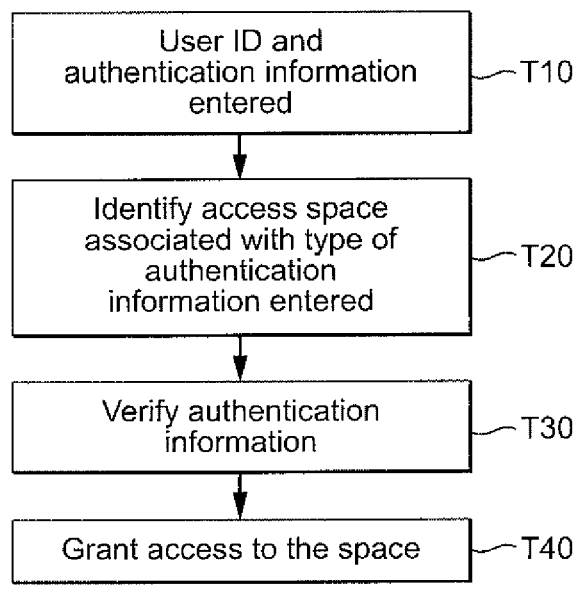
FIG. 5 is a schematic flow chart of another login method.

FIG. 5 illustrates an improved method as may be implemented by the security 210 in accordance with embodiments disclosed herein.

At step T10 an authentication request is generated for a user. For example, the user may be presented with a single login stage at a single point of entry, e.g. a single login screen or prompt at a single terminal 204, 118c, 112 or 116. At this single login stage, the user enters a single user ID (e.g. single username) identifying the user for all potential levels of access. The user need only provide this user ID once regardless of the level he or she is accessing. Further, at this single login stage (e.g. single login screen or prompt), the user enters one or more personal authentication elements such as a password, address, finger print, iris scan or written signature via the relevant part of the terminal's interface. Alternatively or additionally, one or more of the personal authentication elements may be retrieved automatically from the user at the login stage, e.g. facial recognition, detection of the user's behaviour, or detection of the location or proximity of the user's mobile terminal. The terminal 204, 118c, 112 or 116 formulates a login request comprising the user ID and information on the associated one or more personal authentication elements.

Alternatively, the authentication request could be generated in an automated (or at least partially automated) manner. For example if the user presents him or herself at a certain location such as a teller's desk or in front of a teller assisted machine, the relevant terminal may automatically collect one or more authentication elements such as an image of the user for use in image recognition and/or a sample of the user's voice for use in voice recognition. Other ways of initiating an authorization request may be used, whether implicitly or explicitly, whether by the user him or herself or on the user's behalf. Embodiments may be described in terms of a login, but it will be appreciated this does not necessarily limit to a conventional login such as where the user is prompted by a login screen (though that is one option).

At step T20, the security module 210 analyses the login request to determine which of the potential types of personal authentication element are present together in the same login request for a given user. In embodiments, the user may explicitly request access to a certain access space. In that case the determination by the security module 210 may be to prompt the user as to the required authentication elements for that space, and/or to check that the required types or types of element are present. Alternatively, the access space in question may be implicit in the type or types of authentication present. E.g. if the user only enters a password the security module 210 infers the user is only requesting access to a first space, but if the user also presents a further form of authentication such as a fingerprint then the security module 210 infers the user desires access to a second space. Or if a terminal can only automatically obtain a facial recognition it may only provide access to a first space, but if it can automatically gather a facial recognition and recognition of the user's voice it may automatically open up a second space, or different non-nested spaces could be associated with the two different types of recognition.

At step T30 the security module 210 verifies whether the personal authentication elements for the requested access space pass the test for authenticating the user in question, e.g. whether the password and/or fingerprint of the login request match the expected password and/or fingerprint for that user. At step T40, the security module 210 grants the user with access to the functionality of the access space determined at step T20, on condition that the personal authentication elements for that level are successfully verified by step T30.

In embodiments the security module 210 may be configured to map the level of access (step T20) and/or perform the verification (step T30) at the terminal 204, 118c, 112 or 116 itself. Alternatively the security module 210 may be configured to perform one or both of the mapping (step T20) and/or verification (T30) by referring to another network element such as one of the servers 110, 114 or the core system 100 and receiving a decision back in response. Either way, the implementation of the mapping may take various forms, e.g. a look-up table, algorithm or any other soft or hardwired relationship implemented in one or more storage devices of one or more of the network elements 100, 110, 112, 114, 116, 118, 132, 202 and/or 204 shown schematically in FIG. 1.

The security module 210 may be operable to provide the same user with access to different functionality spaces of the system on different occasions. That is, that if the user logs in with a first one or more of the different types of personal authentication elements then the user is provided with access to only a first of said spaces and straight to the first space; but, if that same user logs in with a second one or more of the potential types of personal authentication elements, then the user is provided with access only to a second one of said spaces and straight to that space (without having to go through a stage of logging in to the first level, then separately logging in from the first level to the second level, or vice versa). Hence on one occasion, the user can go straight to a first access space in a single login step, and on another occasion the user can go straight to a second, different access space in a single login step. In embodiments, the user may go straight to a third or further access space based on a respective one or more third or further authentication elements.

The different spaces consist of different combinations of functions of the system. In embodiments the combinations are not completely exclusive of one another, i.e. one space can comprise some of the functions of another space. But also, in embodiments the spaces are not entirely nested either, i.e. one of the spaces can comprise functions not included in another of the spaces while at the same time, vice versa, the other space can comprise functions not in the first. For example a second space may comprise most of the functions of the first space plus some additional, often more secure, functionality such as higher value or more advanced kinds of transactions, but still may not include one or some of the functions of the first space. Thus in embodiments the spaces may provide a comprise between the two approaches in which may be termed a "hybrid" hierarchy or partial nesting, not strictly hierarchical but at the same time not entirely exclusive or entirely without the nature of a hierarchy.

Furthermore, in embodiments access to one or more of the spaces may be based on combinations other than just "AND" type conditions for all the elements in that combination, such as "NOT" type conditions (passed on condition of the test for one or more authentication elements being false) or "OR" type conditions (passed on condition of at least one or some of the tests for a plurality of authentication elements being true). For example the user may be granted access to a certain space if the tests for authentication elements A and B are true but not if a test for authentication element C is true. In another example the user may be granted access to a certain space if either one of authentication elements B or C are present and verified, while A would not be relevant to gaining; or access to a certain space may be granted on condition that any two of elements A, B and C are present and verified. In such cases the mapping between the access space and the one or more respective authentication elements is via some logical mapping function other than just a plain AND type mapping relationship whereby the space maps to "all elements are present".

It will be appreciated that embodiments of the present invention do not preclude a terminal and/or a banking system that also allows a user to access an unsecured space, where that unsecured space does not require the user to provide an authentication element in order for the requested transaction to be carried out. An example of such a transaction is the deposit of a cheque and an associated paying-in slip, where the paying-in slip provides all details necessary for identifying the account to which the amount of the cheque should be credited. It will also be appreciated that a terminal and/or banking system of this invention may additionally enable a user to access an unverified access space in order to allow the user to request a type of transaction that does not require verification of the one or more personal authentication elements.

In an example application of the present invention, access spaces correspond to different user roles. For instance, a teller may be given access to transactions but need not necessarily have access to diagnostic or other maintenance functions, while a technician may be provided with these functions but not the ability to conduct actual customer transactions. As another example, the teller may be given access to cash dispensing functions but access to only limited records, while an administrator or manager at a remote office such as a headquarters may have access to more records but need not necessarily be given the ability to dispense cash. In another example, different threshold values may be applied for tellers and cash-in-transit operators, e.g. so the amount a teller can dispense to a customer may be set to a different value than the amount a cash-in-transit operator can remove for delivery to a different machine. It may be appropriate to give these different members of staff of different responsibilities different ways of being authenticated to the system.

In yet another example, a customer level may only provide access to a customer's own account, but may be accessed based only on a username plus password and/or PIN. A teller level may provide access to customers' accounts but only for performing limited kinds or values of transaction. To verify the user's right to access this level of responsibility the teller may require a username, password and form of biometric information such as a fingerprint. Further, a supervisor branch manager level may provide access to higher values and/or more advanced kinds of transaction, and/or to inventory information or inventory management functions for the branch. To allow this higher level of responsibility then two forms of biometric information may be required (e.g. fingerprint and facial recognition). Further, a regional manager level may provide access to inventory information or inventory management functions for a plurality of branches, and/or a technician level may provide access to diagnostic or other maintenance related information functions. Such levels may require more stringent or different combinations of authentication elements.

Alternatively or additionally, there may be provided different access spaces for a given user role. For example, a customer who is only paying money into another user's account may only need basic information to authenticate him or herself like name and/or address; and/or different authentication information may be required depending on whether paying in cash or cheque; the same customer may, however, have to present a card and enter a PIN to withdraw cash. In another example, a customer or teller may be provided with a first level giving access basic information based only on providing a username plus address or account number, and may be provided with a second level giving access to transactions on condition of providing the surname plus a more secure form of authentication such as password and/or fingerprint.

It will be appreciated that the above embodiments have been described only by way of example. Other variants may be implemented by a person skilled in the art given the disclosure herein. The scope of the invention is not limited by the described embodiments but only by the accompanying claims.

The invention claimed is:

1. A terminal for use in a banking system, the banking system comprising a branch banking network including a plurality of network-addressable machines for handling cash and/or physical financial documents, the terminal comprising a teller workstation for connecting to one of said machines, or a teller assisted machine comprising one of said machines, said terminal arranged to connect to one or more of the machines via the network, and wherein each of the machines is a teller cash dispenser, a teller cash acceptor or a teller cash recycler:

an interface operable to receive multiple types of personal authentication elements, wherein one or more of said types of personal authentication elements are associated with an authentication request for a user; and a security module operable to analyze one or more received personal authentication elements and to provide access to a plurality of different access spaces of said system, each access space comprising a different respective function or combination of functions of the system, wherein at least one of said access spaces comprises access to cash and/or document handling functionality of at least one of the machines;

wherein the security module is configured, for each of said access spaces, to provide a mapping between the access space and a respective one or more of said types of personal authentication elements for accessing the access space; said mapping comprising at least one of: a look-up table, an algorithm, or any other soft or hardwired relationship; and based on said mapping, to grant the user with access to one of the access spaces on condition of being mapped to the one or more types of personal authentication elements associated with the authentication request for the user, and on condition of verifying those one or more types of personal authentication elements for the user;

wherein the security module is configured to determine said one of the access spaces without an explicit user selection of said one of the access spaces, said security module configured to determine said one of the access spaces based on determining which of the one or more types of personal authentication elements is received in association with the authentication request;

wherein the function or functions of at least one of said access spaces comprise one or more of: ability to perform a transaction, ability to perform a transaction above a threshold amount, dispensing of cash, depositing of cash, pre-ordering of cash, moving of cash internally within the banking system, inventory information, inventory management, access to information about the user, access to the user's bank records, access to information about customers, access to customers' bank records, access to diagnostic information, maintenance functionality, ability to update software of the terminal or system, ability to change a mode of operation of the terminal of the system, processing a check, functionality relating to processing a check, processing a bill or invoice, functionality relating to processing a bill or invoice, functionality relating to loans, functionality relating to mortgages, ability to perform a customer credit check, functionality relating to investments, functionality relating to valuable items, and/or detecting counterfeit cash;

wherein said access spaces comprise one or more of: a customer access space, a teller access space, a branch access space, a branch manager access space, a regional manager access space, a headquarter access space; and/or a maintenance access space;

wherein the security module is configured to provide access to any one of said access spaces based on the authentication request being initiated by the user through a single point of access in a single login stage;

wherein said personal authentication elements comprises detection of the user's mannerisms or behavior by the security module receiving and analyzing signals from one or more transducers of the terminal; and wherein said detection of the user's mannerisms or behavior comprises one or more of: voice recognition; handwriting recognition; recognition of a written signature; detection of a characteristic typing speed or pattern; detection of a characteristic mouse, touchpad, stylus, tracker ball movement, or pressure pattern, or any combination thereof.

2. The terminal of claim 1, wherein the authentication request comprises a single user identifier for the user, and the security module is configured to provide access to any one of said access spaces based on the single user identifier being presented once by the user.

3. The terminal of claim 1, wherein the security module is operable to provide the same user with different access spaces of the system; such that on condition that the user causes the authentication request to be associated with a first one or more of said types of personal authentication elements then the user is granted access to only a first of said access spaces, and on condition that the same user causes the authentication request to be associated with a second one or more of said types of personal authentication elements then the user is provided with access only to a second of said access spaces and straight to the second access space without having to be first granted access to the first access space.

4. The terminal of claim 1, wherein a first of said access spaces comprises at least one of said functions not included in a second of said access spaces, and the second access space comprises at least one of said functions not included in the first access space.

5. The terminal of claim 1, wherein at least one, at least some, or each of the access spaces is mapped to a respective combination of a plurality of said types of personal authentication elements; and the security module is configured to grant access on condition of the authentication request being associated with the respective combination of types of personal authentication elements.

6. A computer program product comprising code embodied on a computer-readable medium and configured so as when executed to perform operations of:

receiving authentication requests, each associated with at least one of multiple types of personal authentication elements, and at least some of the authentication requests being associated with a plurality of said types of personal authentication elements;

analyzing the received personal authentication elements;

providing access to a plurality of different access spaces of a retail banking system comprising a branch banking network including a plurality of network-addressable machines for handling cash and/or physical financial documents, and a terminal, wherein each of the machines is a teller cash dispenser, a teller cash acceptor or a teller cash recycler, and wherein the terminal comprises a teller workstation for connecting to one of said machines, or a teller assisted machine comprising one of said machines, said terminal arranged to connect to one or more of the machines via the network, each access space comprising a different respective function or combination of functions of the system, wherein at least one of said access spaces comprises access to cash and/or document handling functionality of at least one of the machines;

for each of said access spaces, providing a mapping between the access space and a respective one or more of said types of personal authentication elements for accessing the access space, said mapping comprising at least one of: a look-up table, an algorithm, or any other soft or hardwired relationship; and based on said mapping, granting a user with access to one of the access spaces on condition of being mapped to one or more of the types of the personal authentication elements associated with one of the authentication requests for the user, and on condition of verifying those one or more types of personal authentication elements for the user;

wherein said one of the access spaces is determined without an explicit user selection of said one of the access spaces, said determined access space based on determining which of the one or more types of personal authentication elements is received in association with the authentication request;

wherein the function or functions of at least one of said access spaces comprise one or more of: ability to perform a transaction, ability to perform a transaction above a threshold amount, dispensing of cash, depositing of cash, pre-ordering of cash, moving of cash internally within the banking system, inventory information, inventory management, access to information about the user, access to the user's bank records, access to information about customers, access to customers' bank records, access to diagnostic information, maintenance functionality, ability to update software of the terminal or system, ability to change a mode of operation of the terminal of the system, processing a check, functionality relating to processing a check, processing a bill or invoice, functionality relating to processing a bill or invoice, functionality relating to loans, functionality relating to mortgages, ability to perform a customer credit check, functionality relating to investments, functionality relating to valuable items, and/or detecting counterfeit cash;

wherein said access spaces comprise one or more of: a customer access space, a teller access space, a branch access space, a branch manager access space, a regional manager access space, a headquarter access space; and/or a maintenance access space;

providing access to any one or said access spaces based on the authentication request being initiated by the user through a single point of access in a single login stage;

wherein said personal authentication elements comprises detection of the user's mannerisms or behavior by receiving and analyzing signals from one or more transducers of the terminal; and wherein said detection of the user's mannerisms or behavior comprises one or more of: voice recognition; handwriting recognition; recognition of a written signature; detection of a characteristic typing speed or pattern; detection of a characteristic mouse, touchpad, stylus, tracker ball movement, or pressure pattern, or any combination thereof.

7. A banking system comprising a branch banking network comprising:

a plurality of network-addressable machines for handling cash and/or physical financial documents, wherein each of the machines is a teller cash dispenser, a teller cash acceptor or a teller cash recycler;

a terminal comprising an interface operable to receive multiple types of personal authentication elements, wherein one or more of said types of personal authentication elements are associated with an authentication request for a user, the terminal comprising a teller workstation for connecting to one of said machines, or a teller assisted machine comprising one of said machines, said terminal arranged to connect to one or more of the machines via the network; and a security module operable to analyze one or more received personal authentication elements and to provide access to a plurality of different access spaces of said system, each access space comprising a different respective function or combination of functions of the system, wherein at least one of said access spaces comprises access to cash and/or document handling functionality of at least one of the machines;

wherein at least one of said access spaces comprises access to cash and/or document handling functionality of at least one of said machines;

wherein the security module is configured, for each of said access spaces, to provide a mapping between the access space and a respective one or more of said types of personal authentication elements for accessing the access space, said mapping comprising at least one of: a look-up table, an algorithm, or any other soft or hardwired relationship;

wherein based on said mapping, the security module is configure to grant the user with access to one of the access spaces on condition of being mapped to the one or more types of personal authentication elements associated with the authentication request for the user, and on condition of verifying those one or more types of personal authentication elements for the user;

wherein said one of the access spaces is determined without an explicit user selection of said one of the access spaces, said determined access space based on determining which of the one or more types of personal authentication elements is received in association with the authentication request;

wherein the function or functions of at least one of said access spaces comprise one or more of: ability to perform a transaction, ability to perform a transaction above a threshold amount, dispensing of cash, depositing of cash, pre-ordering of cash, moving of cash internally within the banking system, inventory information, inventory management, access to information about the user, access to the user's bank records, access to information about customers, access to customers' bank records, access to diagnostic information, maintenance functionality, ability to update software of the terminal or system, ability to change a mode of operation of the terminal of the system, processing a check, functionality relating to processing a check, processing a bill or invoice, functionality relating to processing a bill or invoice, functionality relating to loans, functionality relating to mortgages, ability to perform a customer credit check, functionality relating to investments, functionality relating to valuable items, and/or detecting counterfeit cash;

wherein said access spaces comprise one or more of: a customer access space, a teller access space, a branch access space, a branch manager access space, a regional manager access space, a headquarter access space; and/or a maintenance access space;

wherein the security module is configured to provide access to any one of said access spaces based on the authentication request being initiated by the user through a single point of access in a single login stage;

wherein said personal authentication elements comprises detection of the user's mannerisms or behavior by the security module receiving and analyzing signals from one or more transducers of the terminal; and wherein said detection of the user's mannerisms or behavior comprises one or more of: voice recognition; handwriting recognition; recognition of a written signature; detection of a characteristic typing speed or pattern; detection of a characteristic mouse, touchpad, stylus, tracker ball movement, or pressure pattern, or any combination thereof.

\* \* \* \* \*